Dec. 17, 1940.     G. V. JEFFERSON     2,225,117
CABLE OUTLET
Filed June 30, 1939     2 Sheets-Sheet 1

INVENTOR
Glen V. Jefferson.
BY
HIS ATTORNEY

Dec. 17, 1940.        G. V. JEFFERSON        2,225,117
CABLE OUTLET
Filed June 30, 1939        2 Sheets-Sheet 2

INVENTOR
Glen V. Jefferson.
BY
HIS ATTORNEY

Patented Dec. 17, 1940

2,225,117

UNITED STATES PATENT OFFICE 2,225,117

CABLE OUTLET

Glen V. Jefferson, Wilkinsburg, Pa., assignor to The Union Switch & Signal Company, Swissvale, Pa., a corporation of Pennsylvania Application June 30, 1939, Serial No. 282,212

9 Claims. (Cl. 174—75)

My invention relates to cable outlets, and particularly to that class of cable outlets known as railway bootlegs for connecting electrical conductors with the track rails of a railway.

One object of my invention is to provide a cable outlet of the type described having a minimum number of constituent parts, all of which are inexpensive to manufacture.

Other objects and characteristic features of my invention will become apparent as the description proceeds.

I shall describe several forms of cable outlets embodying my invention, and shall then point out the novel features thereof in claims.

Figures 1, 2:
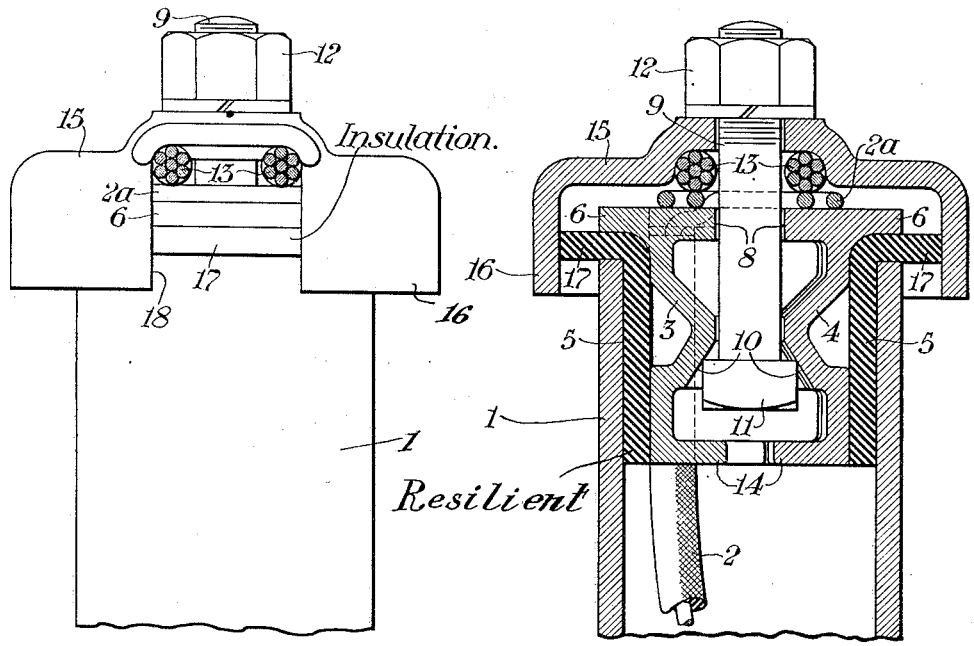
Figures 3, 4:
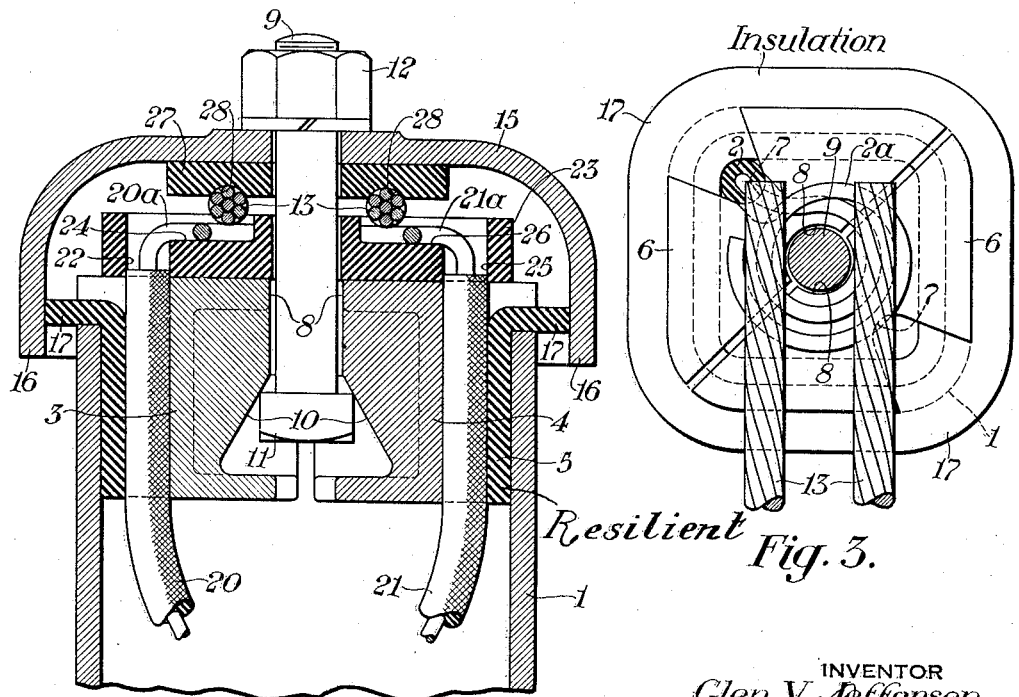
Figure 5:
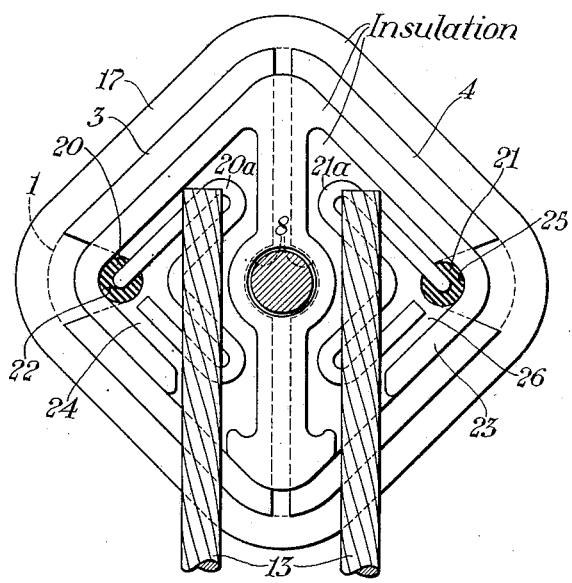
Figure 6:
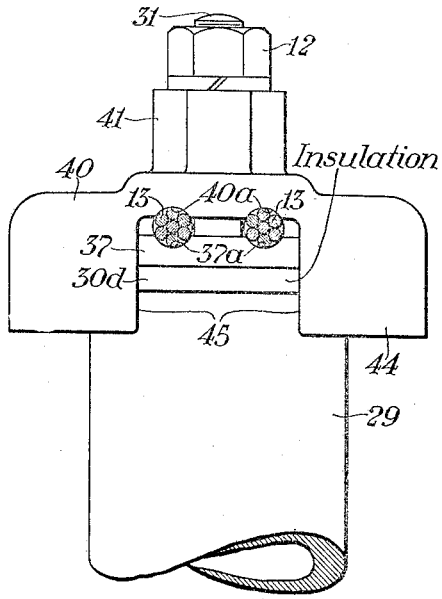
Figure 7:
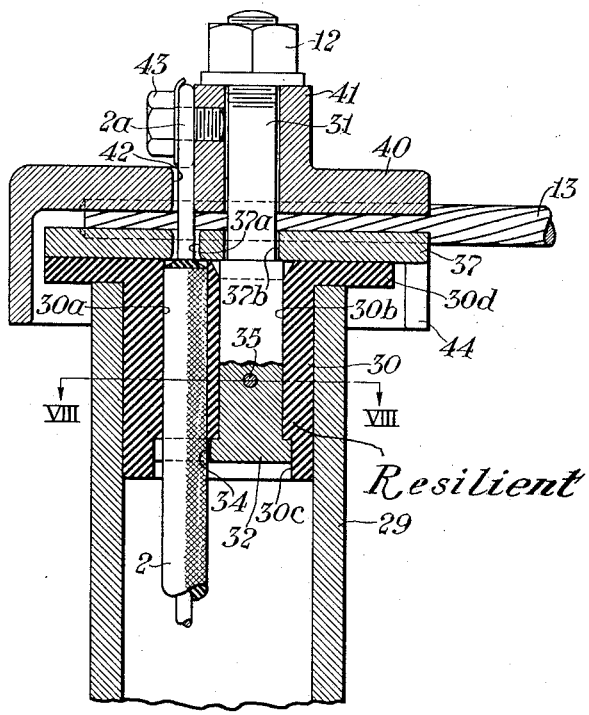
Figure 8:
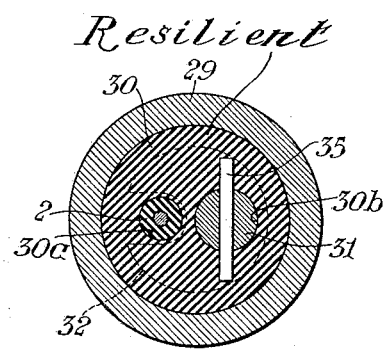

In the accompanying drawings, Fig. 1 is a side elevational view showing one form of bootleg embodying my invention. Fig. 2 is a vertical sectional view of the bootleg shown in Fig. 1. Fig. 3 is a top plan view of the bootleg shown in Figs. 1 and 2 with the cover plate 15 removed, and with some of the parts shown in section to better illustrate the construction of the remaining parts. Figs. 4 and 5 are views similar to Figs. 2 and 3 respectively showing a modification of the bootleg illustrated in Figs. 1, 2 and 3. Fig. 6 is a side elevational view showing another form of bootleg embodying my invention. Fig. 7 is a vertical sectional view of the bootleg shown in Fig. 6. Fig. 8 is a sectional view taken on the line VIII—VIII of Fig. 7.

Similar reference characters refer to similar parts in each of the several views.

Referring first to Figs. 1 and 2, the cable outlet here shown comprises a suitable housing such as a pipe 1, the lower end of which, when the bootleg is in service, will be embedded in the ground, and the upper end of which will project above the surface of the ground. The pipe 1 in the form illustrated is substantially square in cross section, being provided with rounded corners, but it should be distinctly understood that this particular shape is not essential to my invention, and that the pipe may, if desired, be made round or have any other convenient or desired shape. An insulated electrical conductor, which may for example, comprise a parkway cable 2 of the usual and well-known type, is brought up from the ground through the pipe 1, and has the insulation removed from a portion of its upper end to expose the core 2a for the purpose which will appear presently.

Extending into the upper end of the pipe 1 are two metal clamping members 3 and 4 which are insulated from the pipe by an insulating bushing 5 preferably of rubber. The clamping members 3 and 4 are similar, and, as here shown, each comprises a substantially triangular casting provided on two sides with an outwardly extending flange 6, and in one corner with an opening 7 which is just large enough at its inner end to permit an insulated portion of the parkway cable to pass through it. Each clamping member 3 or 4 is also provided with a semicircular opening 8 which mates with the corresponding opening in the other member to form a passageway for the reception of the shank of a vertically extending clamping bolt 9; with an inclined cam or wedging surface 10 which cooperates, for a purpose which will appear hereinafter, with the head 11 of the bolt 9 to force the two clamping members apart when a nut 12 provided on the upper end of the bolt is tightened; and with an inturned flange 14 at its lower end, which flange, together with the flange on the other member, acts to prevent the bolt from dropping downwardly into the pipe when the associated nut 12 is removed. The flange 6 on the two clamping members rests on top of an outturned flange 17 provided on the insulated bushing 5, which latter flange, in turn, rests on top of the pipe 1.

As shown in the drawings, the parkway cable 2 is brought up through the opening 7 in the member 3, and the exposed core 2a is curled around the bolt 9 directly above the two clamping members in the manner shown in Fig. 3. The two stranded wires 13 of a rail connector which it is desired to connect with the parkway cable rest on top of the convolutions of the exposed end of the core 2a, and are securely clamped thereagainst by means of a cover member 15 which is mounted on the upper end of the bolt 9. The cover member 15 is formed with a downturned flange 16 which cooperates with the insulation of the bushing 5 at its outturned flange 17 to assist in protecting the bootleg against the entrance of moisture, and is provided in one side with a suitable opening 18 through which the wires of the rail connector pass.

In installing the bootleg, the cable 2 is first brought up through the pipe 1, and the pipe is then properly secured in the ballast at the side of the rail joint to which connection is to be made. The insulation is next removed from the upper end of the parkway cable leaving approximately six inches of the core exposed at the top of the pipe. The rubber bushing 5 is then inserted in the end of the pipe, after which the two flanged clamping members 3 and 4 with the bolt 9 disposed between them are inserted into the bushing, the parkway cable during this latter operation being located in the opening in the member 3 or 4, as desired. The bare end of the cable is then looped or coiled about the bolt 9 on top of the clamping members 3 and 4, and, if desired, a washer (not shown) may be placed on top of the looped or coiled wire to properly distribute the bearing pressure. The ends of the two wires of the rail bond are then placed on either side of the bolt 9 on top of the washer, or the exposed coiled end of the core of the parkway cable, as the case may be. The cover is then slipped onto the bolt 9, followed by a lock washer, after which the nut 12 is screwed onto the bolt and tightened. During this operation the bolt is prevented from dropping into the housing 1 by the inturned flanges 14 on the two clamping members 3 and 4. As the nut 12 is tightened, the wedging action between the head 11 of the bolt and the cam surfaces 10 on the two clamping members exerts a lateral pressure on the clamping members which forces them apart, and thus causes them to compress the rubber bushing 5 to thereby grip all four sides of the pipe 1, and also to grip the insulation of the cable, whereby the assembly is securely clamped to the pipe. At the same time the wires of the rail connector and the core of the parkway cable are brought into solid electrical contact.

One advantage of a cable outlet constructed in accordance with my invention is that only three castings are necessary and these castings require no machining.

Another advantage of a cable outlet embodying my invention is that only one bolt is required to firmly make the wire connection and to clamp the head to the pipe.

Referring now to Figs. 4 and 5, as here illustrated the cable outlet is arranged to permit two parkway cables 20 and 21 to be separately connected with the two wires 13 of the rail connector. The one cable 20 extends upwardly through the opening 7 in the one clamping member 3 and through a vertically aligned opening 22 provided in an insulating plate 23, and has its exposed core bent over in a manner to fit into a V-shaped recess 24 provided in the upper side of the insulating plate 23, while the other cable similarly extends upwardly through the opening 7 in the other clamping member 4 and through a vertically aligned opening 25 in the insulating plate 23 and has its exposed end bent over in a manner to fit into a V-shaped recess 26 provided in the top of the insulating plate 23 on the opposite side of the bolt 9 from the recess 24. The two standard wires 13 of the rail connector rest respectively on top of the bent ends of the cores of the two cables 20 and 21 within the recesses 24 and 26, and disposed between these cables and the cover is an insulating washer 27 the underside of which is provided with two rounded grooves 28 which receive the wires 13 and tend to hold them in the desired spaced relation. The remainder of the bootleg is similar to that shown in Figs. 1 and 2.

It should be pointed out that with the bootleg connected as shown in Fig. 2 insofar as the bootleg itself is concerned the one cable and associated wire 13 is insulated from the other cable and associated wire, and as a result each one of the standard wires of the rail connector may if desired be connected to a separate track circuit, thereby permitting the two cables 20 and 21 to be separately connected to separate track circuits.

Referring now to Figs. 6 to 8, inclusive, the bootleg here shown comprises a rounded pipe 29 provided at its upper end with a clamping member 30. This clamping member is preferably of soft rubber, and is cored to form two vertically extending openings 30a and 30b, one of which receives the parkway cable 2, and the other of which receives the shank of a clamping bolt 31. The bolt 31 is formed with an eccentric head 32 which fits into a recess 30c formed in the bottom of the clamping member, and this head is provided in one side with an opening 34 which receives the parkway cable, whereby the bolt is prevented from turning when the nut 12 is tightened. The bolt may, if desired, be moulded directly into the clamping member, or if the bolt is not moulded into the clamping member, it may be secured thereto by means of a transverse pin 35 to prevent it from dropping into the pipe 29 while assembling the bootleg. The clamping member 30 is formed at its upper end with an annular flange 30d which cooperates with the top of the pipe 29 to position the clamping member vertically in the pipe, and resting on top of the clamping member is a metal washer or contact plate 37 provided with holes 37a and 37b which align respectively with the openings 30a and 30b provided in the clamping member 30, and which holes receive the exposed upper end or core 2a of the cable 2 and the shank of the bolt 31, respectively. The contact plate will preferably be constructed of brass or bronze. Mounted on the bolt above the contact plate is a top plate or cover 40 provided with a boss 41 which may, for example, be made hexagonal in shape to facilitate gripping the plate with a wrench or other tool to prevent it from turning. The cover 40 is formed with an opening 42 through which the upper or exposed end 2a of the parkway cable passes, and screwed into the boss 41 directly above this opening is a stud 43 by means of which the exposed end or core 2a of the cable 2 may be electrically and mechanically secured to the cover. The wires 13 of the rail connector extend between the contact plate 37 and the cover 40, and are disposed in semi-circular mating grooves 37a and 40a provided in these parts, whereby when the nut 12 is tightened, the wires are securely clamped between the cover and the contact plate in a manner to secure good electrical and mechanical contact between these parts. A downturned flange 44 is formed on the cover to shield the insulated bushing from the weather, and a portion of this flange is cut away at one side to provide an opening 45 through which the wires 13 of the rail connector pass. It will be apparent that since the parkway cable 2 is secured to the cover by means of the stud 43, and the wires 13 of the rail connector are also secured to the cover, good electrical and mechanical contact is provided between the parkway cable and the rail connector.

In assembling the bootleg shown in Figs. 6 to 8, inclusive, the parkway wire is brought up through the pipe 1 and is then inserted in the opening 30a in the clamping member 30. The upper end of the parkway cable then has the insulation removed down to the top of the clamping member. The clamping member is next pushed into the top of the pipe, the contact plate 37 applied, and the wires 13 of the rail connector laid in the grooves in the upper surface of the contact plate. The cover is then put on and the bolt drawn up tightly. As the bolt is drawn up, it compresses the bushing thereby producing a lateral pressure on the bushing which causes it to bind the parkway cable and to secure the head to the pipe. The contact plate 37 is held firmly down against the bushing, and the cover secures the wires and establishes good electrical contact.

One advantage of the form of bootleg shown in Figs. 6 to 8 is that since the rubber bushing expands to fit tightly within the upper end of the pipe 29, the pipe 29 is thoroughly sealed against the entrance of moisture which makes it unnecessary to use other sealing means to accomplish this result.

Although I have herein shown and described only a few forms of cable outlets embodying my invention, it is understood that various changes and modifications may be made therein within the scope of the appended claims without departing from the spirit and scope of my invention.

Having thus described my invention, what I claim is:

1. An outlet for securing the core of an insulated electrical conductor to a rail connector comprising a housing projecting upwardly from the ground and enclosing the conductor, clamping means insulated from the housing and provided with an opening through which an insulated portion of said conductor passes and with a single vertically disposed clamping bolt and with means effective when said bolt is tightened for exerting an outward lateral pressure on the parts to wedge them within the housing and to grip the insulation of said conductor, and means cooperating with said bolt for electrically connecting said rail connector with the core of said conductor.

2. An outlet for securing the core of a parkway cable to a rail connector comprising a housing projecting upwardly from the ground and enclosing the cable, clamping means insulated from the housing and provided with an opening through which an insulated portion of said cable passes and with another opening through which a clamping bolt passes, a cover for said housing secured in place by said clamping bolt, means for exerting an outward lateral pressure on said clamping means when said bolt is tightened to secure the parts to said housing and to grip the insulation of said conductor, and means cooperating with said bolt for electrically and mechanically connecting the core of said cable with said rail connector.

3. An outlet for securing a parkway cable to a rail connector comprising a housing projecting upwardly from the ground and enclosing the cable, clamping means disposed in the upper end of said housing and insulated therefrom and provided with a first opening through which the upper end of said cable passes and with a second opening through which a vertically disposed clamping bolt passes, a cover for the upper end of said housing provided with an opening which receives the upper end of said bolt, means effective when said bolt is tightened for exerting an outward lateral pressure on said clamping means which secures the parts to said housing, and means including said bolt for securing the core of said parkway cable to said rail connector.

4. An outlet for securing a parkway cable to a rail connector comprising a housing projecting upwardly from the ground and enclosing the cable, two clamping members disposed in the upper end of said housing and insulated therefrom and one provided with an opening through which said cable passes, a vertically disposed clamping bolt extending upwardly between said clamping members and cooperating with means provided on the members for exerting on them a lateral force which secures them within the housing when said bolt is tightened, the upper end of said cable having the insulation removed therefrom and having the exposed core disposed about said bolt above said clamping members and said rail connector being disposed above said exposed core, and a cover mounted on said bolt and acting when said bolt is tightened to clamp said cable and said rail connector together.

5. An outlet for securing a parkway cable to a rail connector comprising a substantially rectangular housing enclosing the conductor, a soft rubber insulating bushing fitting into the open end of said housing, two triangular clamping members fitting in said bushing and one provided with an opening through which said cable passes and each provided with a semicircular opening which mates with a similar opening in the other member to form a passageway for the shank of a vertically extending bolt, each said clamping member also being provided with an inclined cam surface which cooperates with the head of said bolt when the bolt is tightened to force said clamping members apart to wedge them within said housing and with an inturned flange which cooperates with the head of said bolt to prevent it from dropping into said housing during assembly of the outlet, the upper end of said cable having the insulation removed therefrom and having the exposed core disposed about said bolt above said clamping members and said rail connector being disposed above said exposed core, and a cover mounted on said bolt and acting when said bolt is tightened to clamp said cable and said rail connector together.

6. An outlet for securing a parkway cable to a rail connector comprising a housing projecting upwardly from the ground and enclosing the conductor, expansible clamping means disposed in said housing and insulated therefrom and provided with an opening through which said cable passes and with an opening which receives a clamping bolt for expanding said clamping means to secure said means within said housing, and a cover mounted on said bolt and covering said expansible means and acting when said bolt is tightened to complete electrical contact between said cable and said rail connector.

7. An outlet for separately securing a pair of parkway cables to separate rail connectors comprising a housing projecting upwardly from the ground and enclosing the conductor, two clamping members insulated from said housing and each provided with an opening through which the upper end of a different one of said cables passes, a clamping bolt extending upwardly between said members and cooperating therewith in a manner to force said members apart when said bolt is tightened to wedge the parts within said housing, said openings in said clamping members being so disposed that when said members are forced apart they will grip said cables, an insulating member disposed on said bolt above said members and provided with openings through which said cables pass and in its upper side with recesses which receive the exposed ends of said cables, the two wires of said rail connector being disposed one in engagement with the exposed end of each cable, an insulating washer on said bolt above said rail connectors, and a cover disposed on said bolt above said washer and effective when said bolt is tightened to clamp said connectors in engagement with the associated cables to electrically and mechanically connect them together.

8. An outlet for separately securing a pair of parkway cables to separate rail connectors comprising a housing projecting upwardly from the ground and enclosing the conductor, two clamping members insulated from said housing and each provided with an opening through which the upper end of a different one of said cables passes, a clamping bolt extending upwardly between said members and cooperating therewith in a manner to force said members apart when said bolt is tightened to wedge the parts within said housing, an insulating member disposed on said bolt above said members and provided with openings through which said cables pass and in its upper side with recesses which receive the exposed ends of said cables, the two wires of said rail connector being disposed one in engagement with the exposed end of each cable, an insulating washer on said bolt above said rail connectors, and a cover disposed on said bolt above said washer and effective when said bolt is tightened to clamp said connectors in engagement with the associated cables to electrically and mechanically connect them together.

9. A cable outlet for connecting an insulated electrical conductor with a rail connector comprising a housing extending upwardly from the ground and enclosing the conductor, a rubber clamping member disposed in the upper end of said housing and provided with an opening through which said conductor passes and with an opening which receives the shank of a clamping bolt, a metal plate disposed above said clamping member and insulated from said pipe by said clamping member and provided with openings which receive said cable and said bolt respectively and with a groove which receives said rail connector, and a cover mounted on said bolt and engaging said rail connector, the parts being so proportioned and so designed that when said bolt is tightened a lateral force will be exerted on said clamping member which secures the parts to said housing and which causes said cable and said rail connector to be securely clamped between said cover and said plate.

GLEN V. JEFFERSON.